(12) United States Patent
Lumme et al.

(10) Patent No.: US 7,795,523 B2
(45) Date of Patent: Sep. 14, 2010

(54) GENERATION OF EXERCISE INSTRUCTION INFORMATION

(75) Inventors: Lauri Lumme, Oulu (FI); Jussi Lånsimaa, Oulu (FI)

(73) Assignee: Polar Electro Oy, Kempele (FI)

( * ) Notice: Subject to any disclaimer, the term of this patent is extended or adjusted under 35 U.S.C. 154(b) by 0 days.

(21) Appl. No.: 11/939,942

(22) Filed: Nov. 14, 2007

(65) Prior Publication Data

US 2008/0134862 A1   Jun. 12, 2008

(30) Foreign Application Priority Data

Nov. 15, 2006   (FI) .................................. 20065725

(51) Int. Cl.
*G10H 7/00*   (2006.01)

(52) U.S. Cl. ....................................................... 84/612

(58) Field of Classification Search ................... 84/612; 700/94; 482/3–9, 900, 901
See application file for complete search history.

(56) References Cited

U.S. PATENT DOCUMENTS

| | | | |
|---|---|---|---|
| 6,746,247 B2 | 6/2004 | Barton | |
| 6,778,866 B1 | 8/2004 | Bettwy | |
| 2006/0107822 A1* | 5/2006 | Bowen | 84/612 |
| 2006/0111621 A1 | 5/2006 | Coppi et al. | |
| 2006/0169125 A1* | 8/2006 | Ashkenazi et al. | 84/612 |
| 2006/0253210 A1* | 11/2006 | Rosenberg | 700/94 |
| 2007/0074618 A1* | 4/2007 | Vergo | 84/612 |
| 2007/0074619 A1* | 4/2007 | Vergo | 84/612 |
| 2007/0113725 A1 | 5/2007 | Oliver et al. | |
| 2007/0113726 A1* | 5/2007 | Oliver et al. | 84/615 |
| 2007/0169614 A1* | 7/2007 | Sasaki et al. | 84/612 |
| 2007/0221045 A1* | 9/2007 | Terauchi et al. | 84/609 |
| 2008/0103022 A1* | 5/2008 | Dvorak et al. | 482/3 |

FOREIGN PATENT DOCUMENTS

EP   1852154 A1   7/2007

* cited by examiner

*Primary Examiner*—Jeffrey Donels
(74) *Attorney, Agent, or Firm*—Hoffmann & Baron, LLP

(57) ABSTRACT

In the invention there is generated a playlist of music files that controls an exercise, each of the music files being associated with at least one parameter. The parameter characterizes the efficiency of the exercise. The user may listen to the playlist while performing an exercise and may have a performance instruction through musical characteristics, such as rhythm.

17 Claims, 7 Drawing Sheets

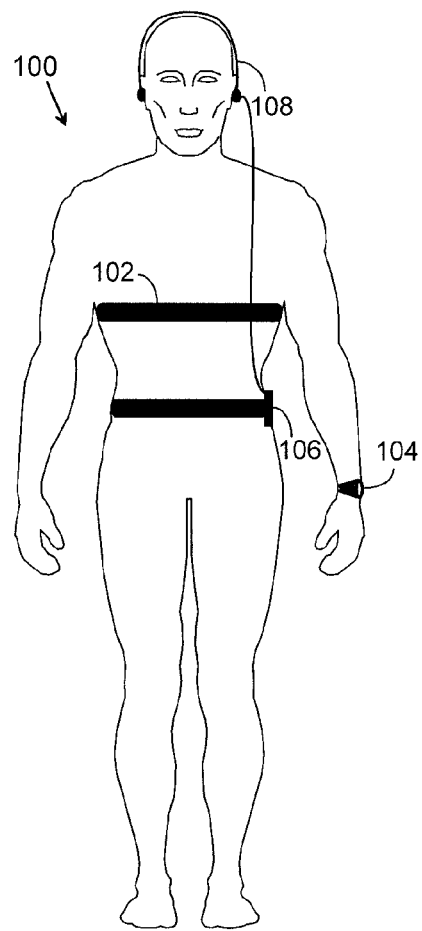
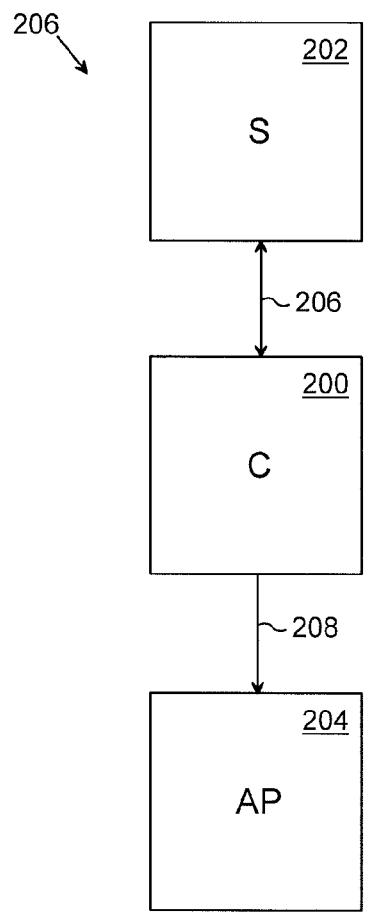
Fig. 1
Fig. 2
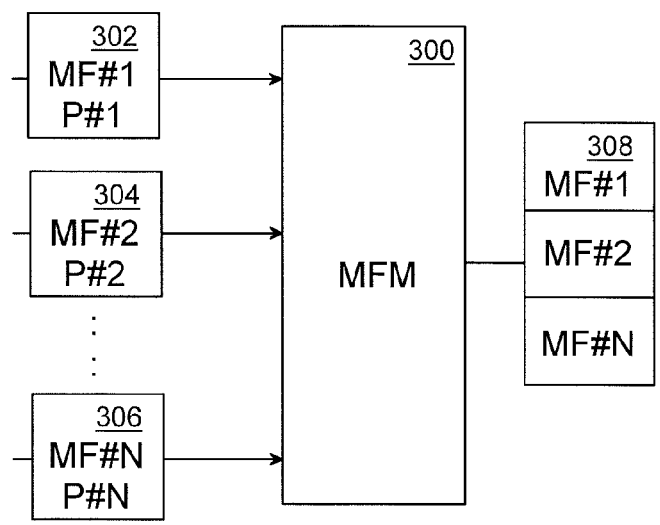
Fig. 3

GENERATION OF EXERCISE INSTRUCTION INFORMATION

CROSS-REFERENCE TO RELATED APPLICATION

This application claims priority based on Finnish Patent Application No. 20065725, filed Nov. 15, 2006, which is incorporated herein by reference.

BACKGROUND OF THE INVENTION

1. Field of the Invention

The invention relates to a method for generating exercise instruction information and a system and a computer program implementing the method.

2. Description of the Related Art

It is commonly known that music stimulates physical activity of a human being, which may be manifested, for instance, as dancing, exercising, running or walking. It is known that the stimulating effect of the music depends on musical characteristics, such as rhythm and harmony. Thus, various types of music may be used for controlling an exercise by playing music to the exercise performer. Musical characteristics, such as rhythm and intensity, affect the strength and quality of the stimulation and consequently the selection of music will have an effect on the actual performance.

The selection of the music is typically based on the exercise performer's subjective assessment on the music. The subjective assessment will, however, lead to a nondeterministic result, and the use of music as a medium for controlling the performance will not result in a performance of the desired type.

SUMMARY OF THE INVENTION

The object of the invention is to provide a method and a system and a computer program implementing the method such that the stimulating effect of music would be objectively assessed.

A first aspect of the invention is a method for generating exercise instruction information, which method generates a playlist of music files that controls the exercise, each of the music files being associated with at least one parameter that characterizes the efficiency of the exercise.

A second aspect of the invention is a computer program comprising encoded instructions for executing a computer process in a digital processor, in which computer process there is generated a playlist of music files that controls a performance, each of the music files being associated with at least one parameter that characterizes the efficiency of the exercise.

A third aspect of the invention is a system for generating exercise instruction information, the system comprising means for generating a playlist of music files that controls a performance, each of the music files being associated with at least one parameter that characterizes the efficiency of the exercise.

Preferred embodiments of the invention are disclosed in dependent claims.

The basic idea of the invention is that a playlist that controls an exercise is generated from music files, each of the music files being associated with a parameter characterizing the efficiency of the exercise.

Several advantages are achieved with the method, the system and the computer program of the invention. An advantage is that the invention generates a playlist whose controlling effect on the exercise is previously known on the basis of the music file parameters of the playlist.

BRIEF DESCRIPTION OF THE DRAWINGS

In the following, the invention will be described in greater detail in connection with preferred embodiments, with reference to the attached drawings, in which FIG. 1 shows an example of an exercise performer, FIG. 2 is a first example of an embodiment of a system, FIG. 3 is a second example of an embodiment of the system.

DETAILED DESCRIPTION OF THE PREFERRED EMBODIMENTS

Figure 4:
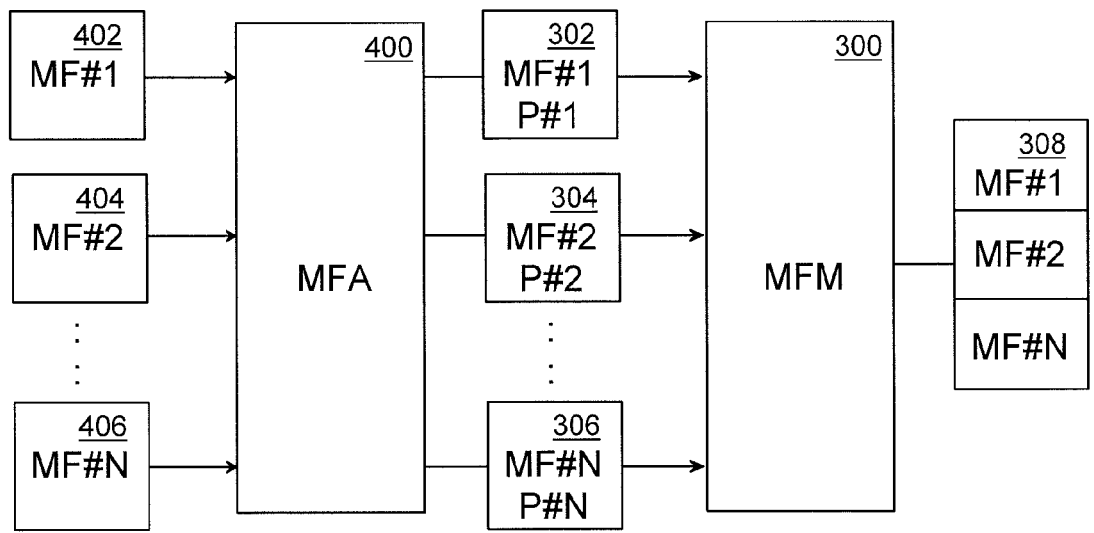
FIG. 4 is a third example of an embodiment of the system.

With reference to FIG. 1, let us examine an example of a performer 100 of exercise item, who uses an audio player 106 through ear-pieces 108. FIG. 1 also shows an exercise monitor 102, 104, which may comprise a wrist-worn device 104 and a heart rate measuring unit 102. The heart rate measuring unit 102 typically measures the user's heart rate and transmits the heart rate information in a wireless or galvanic manner to the wrist-worn device 104. The wrist-worn device 104 may record performance data, such as heart rate data or movement data based on acceleration measurements, for instance, during the performance.

With reference to FIG. 2, there is given an example of a system 206, which in one embodiment comprises a data processing device (C) 200, a server (S) 202 and an audio player (AP) 204.

The data processing device 200 is typically equipment provided with a user interface, such as a computer, a mobile station or a PDA (Personal Digital Assistant) that may be connected through a wireless or a galvanic connection to the audio player 204. The data processing device 200 may feed the playlist as such and/or playlist information 208 into the audio player 204.

The data processing device 200 may communicate with the server 202 over the Internet, for instance.

The audio player 204 is a device that is suitable for playing a music file. The audio player 204 typically comprises a mass memory, such as disk memory or a memory circuit for storing music files. The audio player 204 may be digital or analogue. In an embodiment the audio player 204 is portable. The audio player 204 may be integrated, for instance, with a mobile station or another portable electronic device. In an embodiment the audio player 204 is part of the data processing device 200.

With reference to FIG. 3, the system comprises a music file manager (MFM) 300, which receives music objects 302, 304, 306 and forms a playlist 308 of the music objects 302, 304, 306.

The music object 302, 304, 306 consists of a file object MF#1, MF#2, MF#N and a parameter P#1, P#2, P#N associated with the file object MF#1, MF#2, MF#N.

File object MF#1, MF#2, MF#N is data associated with a piece of music. In one embodiment file object MF#1, MF#2, MF#N is a music file in which the piece of music is in an encoded form. File object MF#1, MF#2, MF#N may be a music file encoded with a code based on MPEG standard, such as an MP3 file (MPEG-1 Audio Layer 3), for instance.

In an embodiment file object MF#1, MF#2, MF#N is a bit string that includes a music file identifier. The music file identifier may be the title of the piece of music or a number or any bit string that is associated with a given piece of music.

Parameter P#1, P#2, P#N characterizes the efficiency of the exercise performed by the user 100 as the user 100 listens to the content of the music file associated with parameter P#1, P#2, P#N.

In an embodiment parameter P#1, P#2, P#N characterizes the heart rate of the user by means of a heart rate frequency, for instance.

In an embodiment parameter P#1, P#2, P#N characterizes energy consumption during an exercise.

In an embodiment parameter P#1, P#2, P#N characterizes step pace during an exercise.

In an embodiment parameter P#1, P#2, P#N characterizes pedalling rate, such as pedalling rate on a bicycle or an exercise bike.

In an embodiment parameter P#1, P#2, P#N characterizes an excitement factor of the performance. The performance may be a sport having an excitement factor and involving a risk, such as stumbling or falling. These sports include alpine skiing, snowboarding and climbing. Intensive music may affect the user 100 such that the user is tempted to limits of risk taking in performance.

In an embodiment parameter P#1, P#2, P#N characterizes the user's propagation speed.

In an embodiment parameter P#1, P#2, P#N characterizes the user's activity which is presented, for instance, as a pulse frequency associated with the user's body movement.

Parameter P#1, P#2, P#N may characterize momentary values, mean values or maximum values of the above-described variables.

Parameter P#1, P#2, P#N may be associated with the user's target rate values, for instance, as follows:

P=1: very light exercise, heart rate area 50 to 60% of maximum heart rate

P=2 light exercise, heart rate area 60 to 70% of maximum heart rate

P=3 moderate exercise, heart rate area 70 to 80% of maximum heart rate

P=4 heavy exercise, heart rate area 80 to 90% of maximum heart rate

P=5 very heavy exercise, heart rate area 90 to 100% of maximum heart rate.

Parameter P#1, P#2, P#N may characterize the rhythm or intensity of the music, for instance. Then the user's experience when listening to the music is to try to achieve the target heart rate area represented by the parameter.

The playlist 308 includes instructions to play the selected music files successively in a desired order. The playlist 308 may consist of music files to be played or music file identifiers.

As an example, we assume the following parameters: P#1=2, P#2=4, P#3=1. In that case, the playlist 308 comprises the instructions to play a series of music files, the first of which instructs the user 100 to perform a light exercise (P=2). The light exercise is followed by a heavy exercise (P=4) and the last exercise is a very light exercise (P=1).

The music file manager 300 may be implemented by means of a computer program executed in a digital processor.

In an embodiment the music file manager 300 is located on a server 202 and the playlist 308 is conveyed to an audio player 204 directly from the server 202 or via a data processing device 200.

In an embodiment the music file manager 300 is located in a data processing device 200, and the playlist 308 is fed from the data processing device 200 to the audio player 204. The music files on the playlist 308 may originally be located in the audio player 204 or they may be downloaded to the audio player from the data processing device 220 or the server 202.

In an embodiment the music file manager 300 encodes a parameter P#1, P#2, P#3 onto the playlist 308. Parameter P#1, P#2, P#3 may be encoded such that the code is not audible while the music is listened to. The code of parameter P#1, P#2, P#3 may be placed at the beginning of each piece of music, for instance. The code may be used, for instance, when the exercise is later analysed. During the use, the audio player 204 may be connected to an exercise monitor 102, 104, whereby the exercise monitor 102, 104 may decode the code and include the code in the exercise information. In that case it is possible to monitor the mutual correlation between the correct heart rate and the playlist controlling the exercise, for instance.

With reference to FIG. 4, in an embodiment the system comprises a music file analyzer (MFA) 400. The music file analyzer 400 receives music files 402, 404, 406. The music file analyzer 400 analyzes the content of the music file 402 to 406 and associates the music file 402 to 406 with a parameter controlling the exercise. The music file analyzer 400 feeds music objects 302, 304, 306 to the music file manager 300 which generates the playlist 308.

In an embodiment the music file analyzer 400 identifies the dominating, regular time structures in the music file 402 to 406 and associates the music file with a parameter which controls the exercise and which characterizes a heart rate frequency or step pace frequency, for instance.

The music file analyzer 400 may be implemented by means of a computer program executed in a digital processor. The music file analyzer 400 may be implemented on a server 202, in a data processing device 200 and/or an audio player 204.

Figure 5:
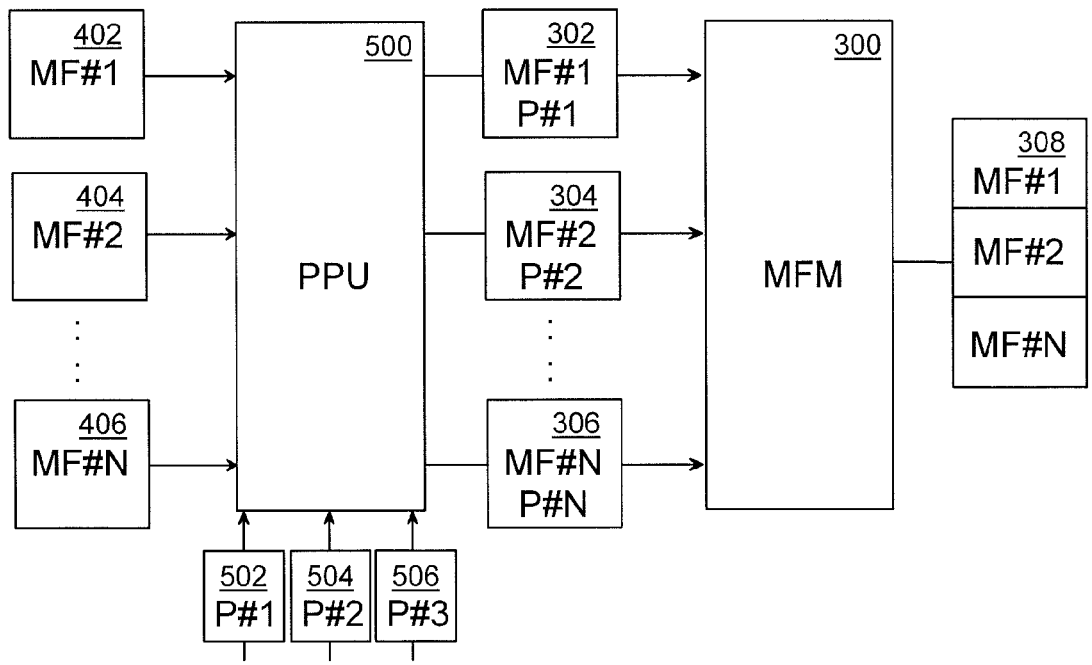
FIG. 5 is a fourth example of an embodiment of the system.

With reference to FIG. 5, the system comprises in an embodiment a pre-processing unit (PPU) 500, which determines a parameter controlling the exercise by means of performance data 502, 504, 506, which performance data 502, 504, 506 is recorded during the exercise while the music file is listened to.

With further reference to FIG. 1, during the exercise the user 100 may listen to the music file and at the same time record exercise information by means of an exercise monitor 102, 104. As an example, let us examine a situation where the user performs a running exercise while listening to a piece of music and lets the beat of the music affect the pace of running. After the exercise the user 100 may load performance information 502, 504, 506 recorded during the exercise into the pre-processing unit 500, which associates the piece of music that was listened to during the exercise with the performance information 502, 504, 506. As a result, the pre-processing unit 500 generates music objects 302 to 306, each of which comprises a file object MF#1, MF#2, MF#N and a parameter P#1, P#2, P#N. In the presented performance form the parameter may characterize a heart rate frequency or energy consumption during the piece of music, for instance.

The pre-processing unit 500 may be implemented by means of a computer program executed in a digital processor. The pre-processing unit 500 may be located on a server 202, in a data processing unit 200 and/or an audio player 204.

Figure 6:
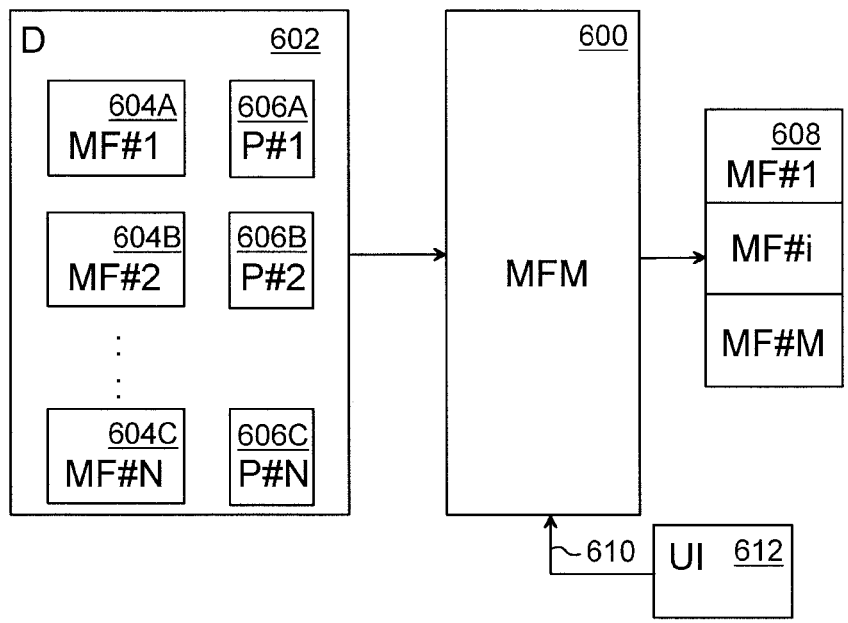
FIG. 6 is a fifth example of an embodiment of the system.

With reference to FIG. 6, the system 206 comprises a display device (D) 602 that is connected to the music file manager 600 and that displays music file identification data 604A, 604B, 604C and a parameter 606A, 606B, 606C to the user.

The system also comprises a user interface (UI) 612, which receives a first selection command 610 from the user for adding a music file to the playlist 608 or for deleting it from the playlist 608.

The display device 602 and the user interface 612 are located in the data processing device 200 or audio player 204. The music file manager 600 may be located on the server 202, in the data processing device 200 and/or an audio player 204.

If the music file manager 600 is located on the server, the music file identification data 604A, 604B, 604C and the parameters 606A, 606B, 606C may be displayed to the user by means of a web browser, for instance.

The user 100 detects the music file identifiers and parameters presented by the display device 602. The user 100 may select a desired music file on the basis of the detected parameter P#1, P#2, P#3.

The music file manager 600 receives the first selection command 610 from the user and forms a playlist 608 on the basis of the first selection command from the user.

The user 100 may indicate with an indicating device of the user interface 612, such as a mouse, the identifier 604A to 604C of the desired piece of music, whereby the music file manager 600 associates the music file in accordance with the indicated identifier 604A to 604C to the playlist 608. In an embodiment the music file manager 600 provides a playlist proposal from which the user 100 may select the music files or delete the music files as desired.

Figure 7:
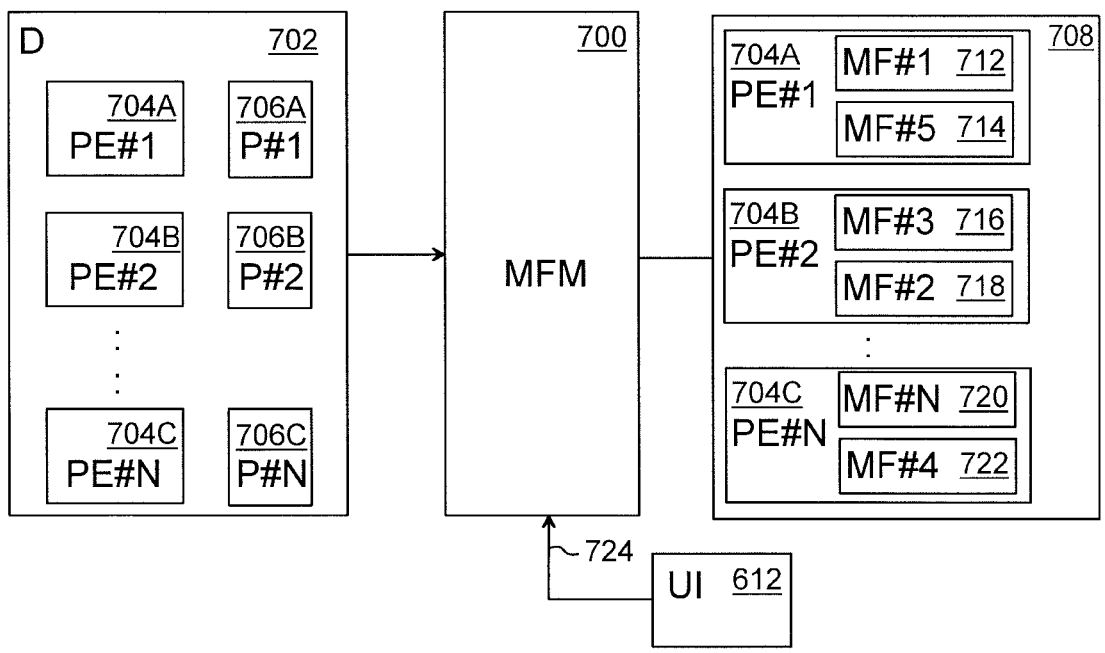
FIG. 7 is a sixth example of an embodiment of the system.

With reference to FIG. 7, in an embodiment the display device 702 displays to the user 100 a exercise program that comprises several periods 704A, 704B, 704C, each of which periods 704A, 704B, 704C is associated with at least one parameter 706A, 706B, 706C.

Period 704A, 704B, 704C is a section in a performance having a specific performance instruction. The period may be e.g. a warm-up period, a heavy exercise period or a cool-down period. Each period may be characterized by means of parameter 704A, 704B, 704C. The following is given as an example:

Period PE#1: warm-up, P=1, duration 10 minutes
Period PE#2: warm-up, P=2, duration 10 minutes
Period PE#3: moderate exercise, P=3, duration 30 minutes
Period PE#4: heavy exercise, P=4, duration 10 minutes
Period PE#5: cool-down, P=2, duration 5 minutes
Period PE#6: warm-up, P=1, duration 10 minutes.

Through the user interface 612 the user may give a second selection command 724 for adding a music file to the period 704A to 704C or for deleting it from the period 704A to 704C. For instance, the user may observe the view of FIG. 6 on the available identification data 604A to 604C and select music files for each period 704A to 704C on the basis of the parameter value seen.

The music file manager 700 receives a second selection command 724 and generates a playlist 708 on the basis of the second selection command 724 from the user. The resulting playlist 708 includes the music file identification data or music files 712 to 722 arranged in accordance with periods 704A to 704C. In that case, during the exercise, the user 100 may listen to several successive pieces of music that are selected in accordance with a time sequence of the exercise.

Figure 8:
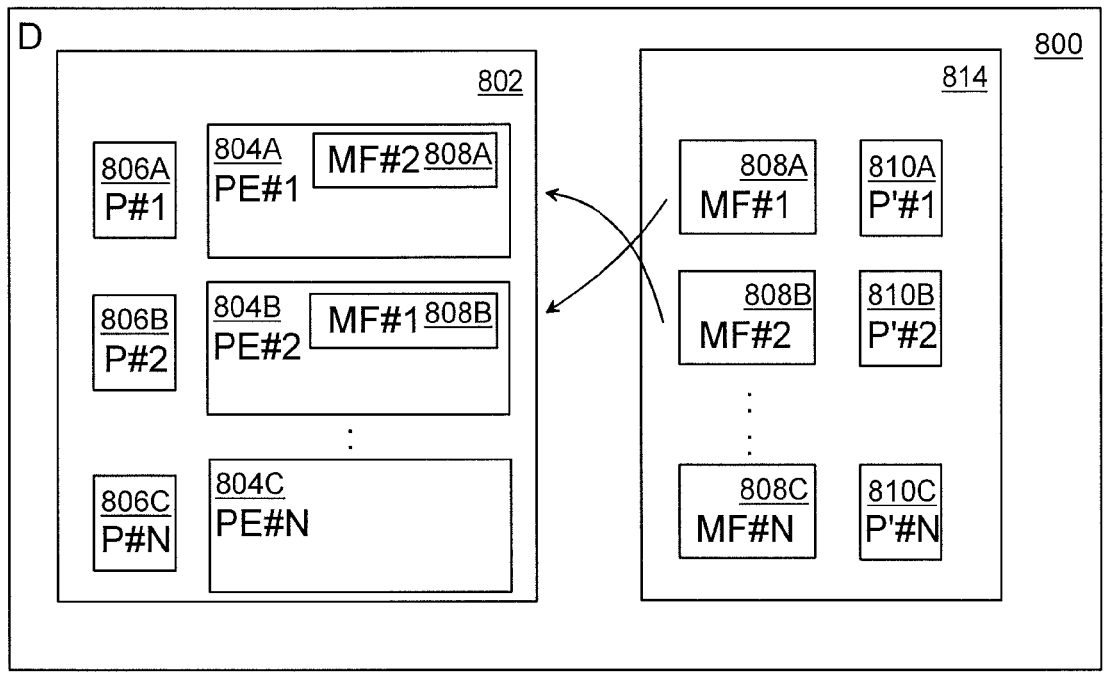
FIG. 8 is a seventh example of an embodiment of the system.
Figure 9:
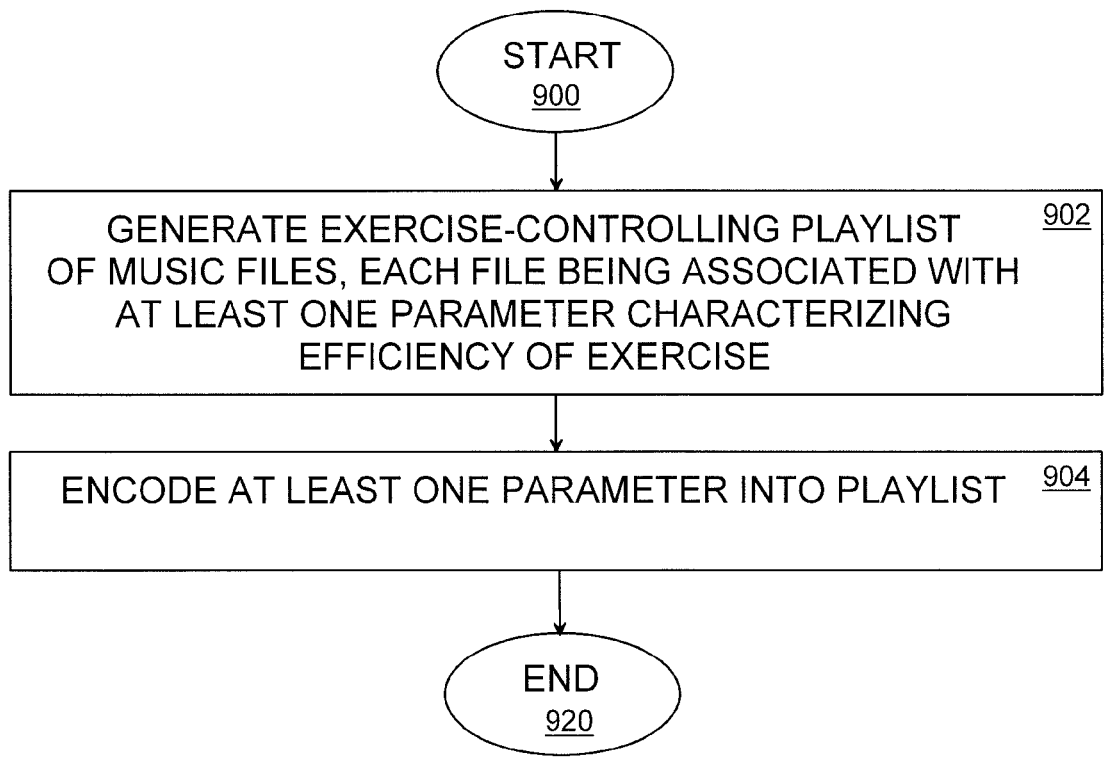
FIG. 9 is a first example of an embodiment of a method.

With reference to FIG. 8, in an embodiment the display device 800 shows to the user 100 a menu structure which comprises a source area 814 and a target area 802.

The source area 814 shows music file identifiers 808A, 808B, 808C and parameters 810A, 810B, 810C associated with the music files.

The target area 802 shows exercise program periods 804A, 804B, 804C and parameters 806A, 806B, 806C associated with periods 804A, 804B, 804C.

The user may form a playlist by means of the user interface 612 of FIG. 7, for instance, by selecting suitable music file identifiers 808A, 808B, 808C. The user 100 may drag a suitable music file identifier 808A, 808B, 808C with the indicating device onto a desired period 804A to 804C, whereby the playlist to be generated is shown to the user 100. In the example of FIG. 8 the user has selected identifier MF#2 for period PE#1 and identifier MF#1 for period PE#2. Different periods 804A to 804C may be displayed to the user with different colours. The display device 800 may be connected to the music file manager 700, which generates a playlist as presented in the target area 802.

With reference to FIGS. 9, 10, 11, 12, 13 and 14 embodiments in accordance with the method and the computer process of the invention will be examined.

The method/computer process starts at 900.

In 902, there is generated a performance-controlling playlist 308 from music files, each of which music files is associated with at least one parameter that characterizes the efficiency of the performance.

In 904, at least one parameter is encoded in the playlist 308.

In 920, the method/computer process ends.

Figure 10:
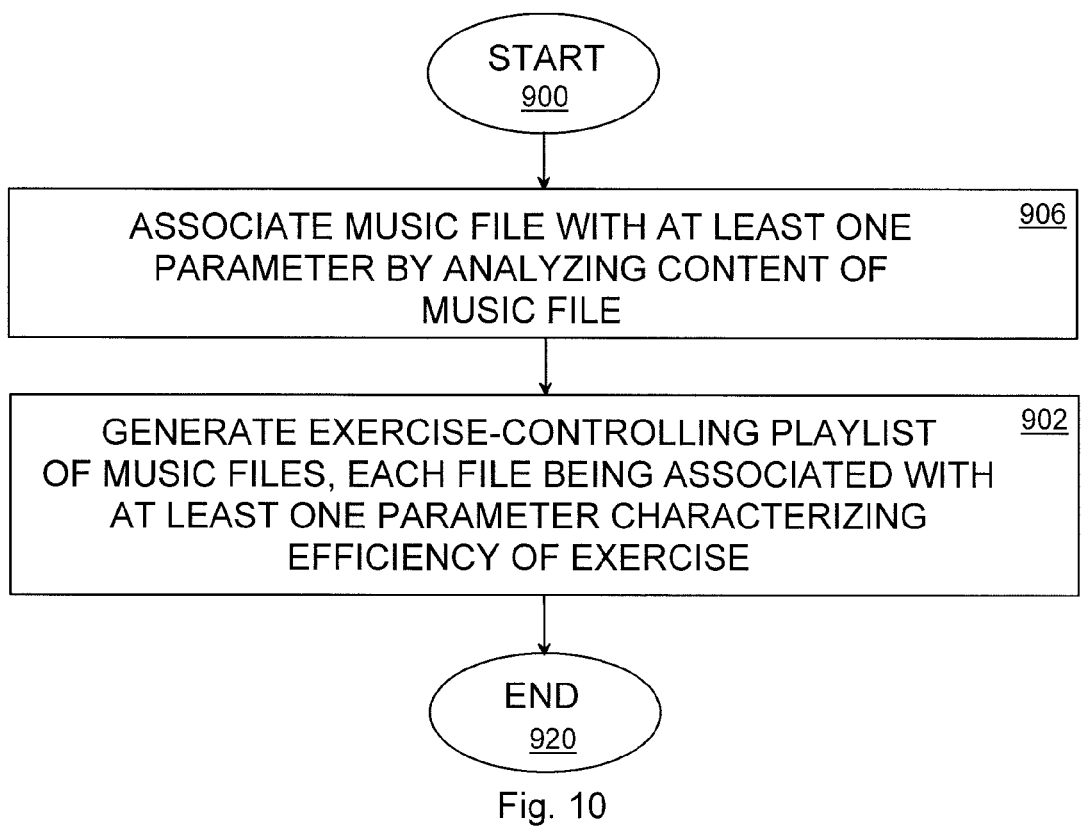
FIG. 10 is a second example of an embodiment of the method.

With reference to FIG. 10, in 906, the music file is associated with at least one parameter by analyzing the content of the music file.

In 902, there is generated a performance-controlling playlist 308 from music files, each of which music files is associated with at least one parameter that characterizes the efficiency of the performance.

In 920, the method/computer process ends.

Figure 11:
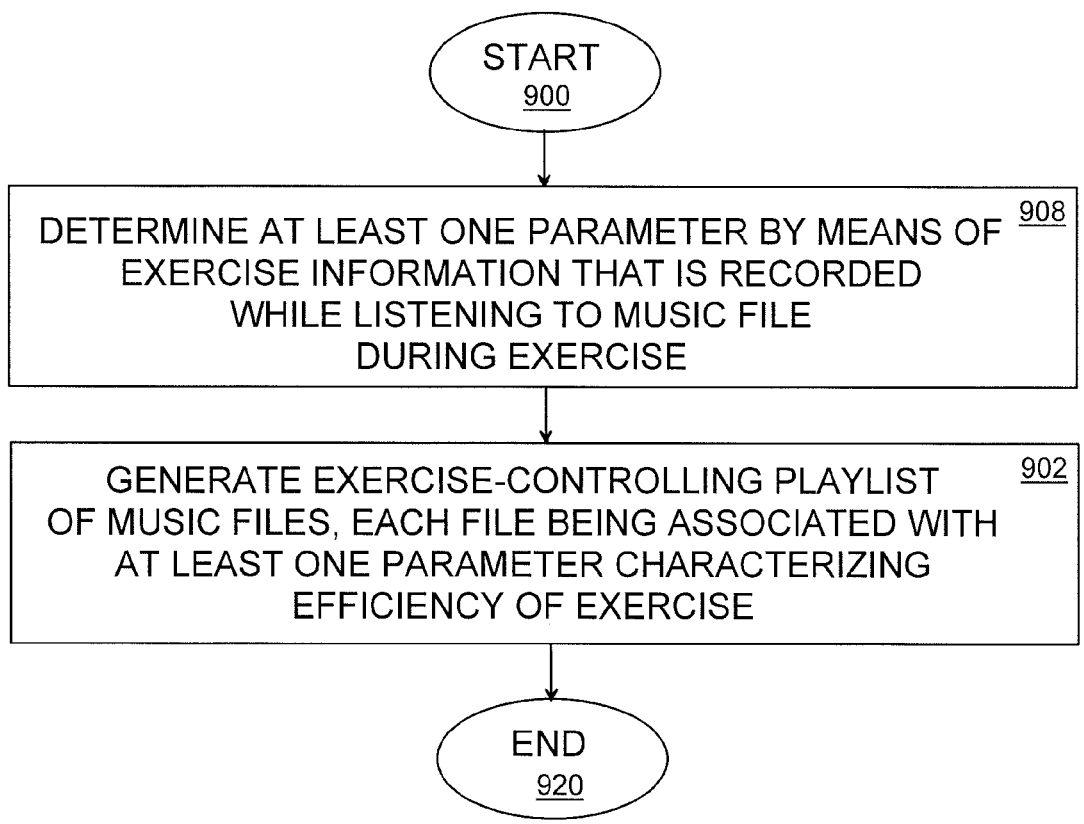
FIG. 11 is a third example of an embodiment of the method.

With reference to FIG. 11, in 908, at least one parameter is determined by means of performance information, which performance information is recorded when listening to the music file during the performance.

In 902, there is generated a performance-controlling playlist 308 from music files, each of which music files is associated with at least one parameter that characterizes the efficiency of the performance.

In 920 the method/computer process ends.

Figure 12:
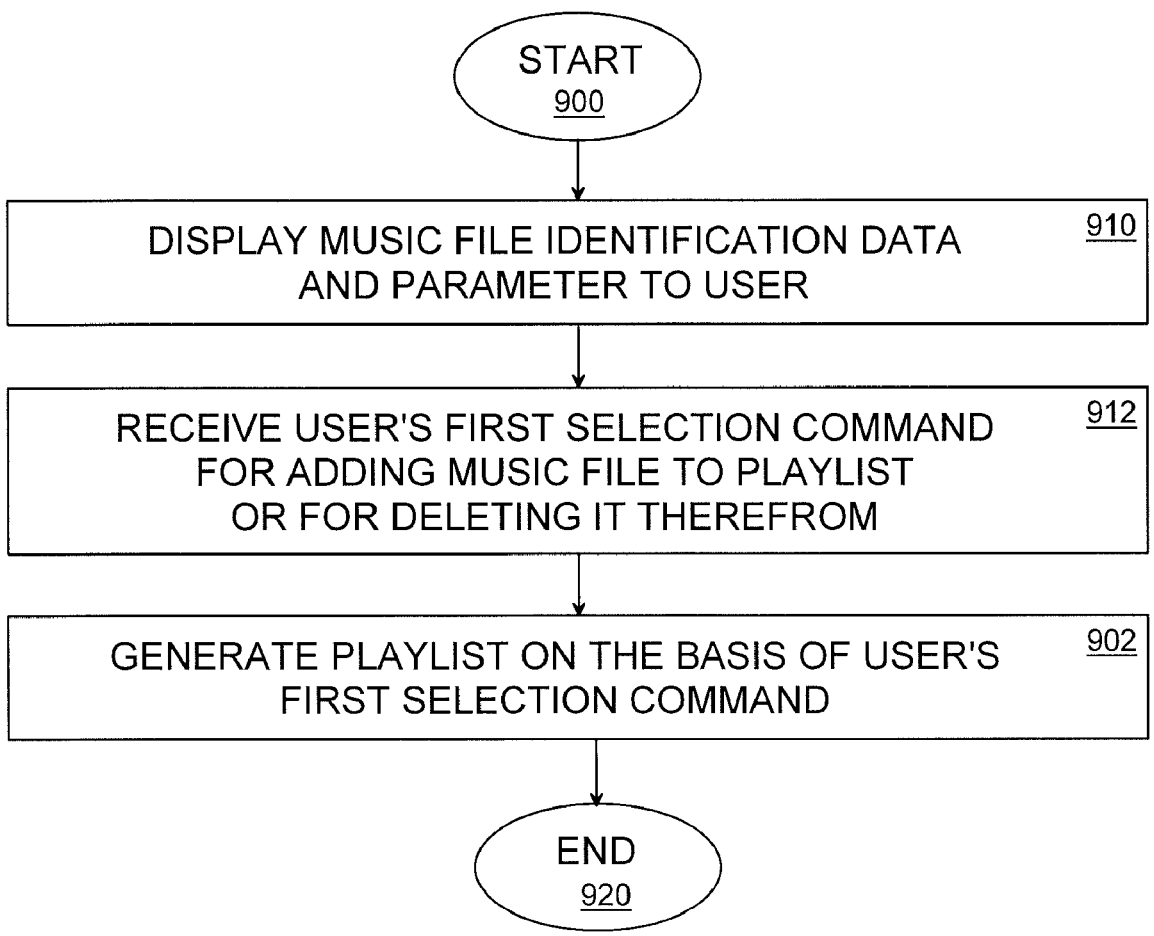
FIG. 12 is a fourth example of an embodiment of the method.

With reference to FIG. 12, in 910 identification data of the music file and a parameter are displayed to the user.

In 912, there is received the user's first selection command 612 for adding the music file to the playlist 318 that controls the exercise or for deleting it from the playlist 308 that controls the exercise.

In 902, there is generated a performance-controlling playlist 308 on the basis of the user's first selection command 612.

In 920 the method/computer process ends.

Figure 13:
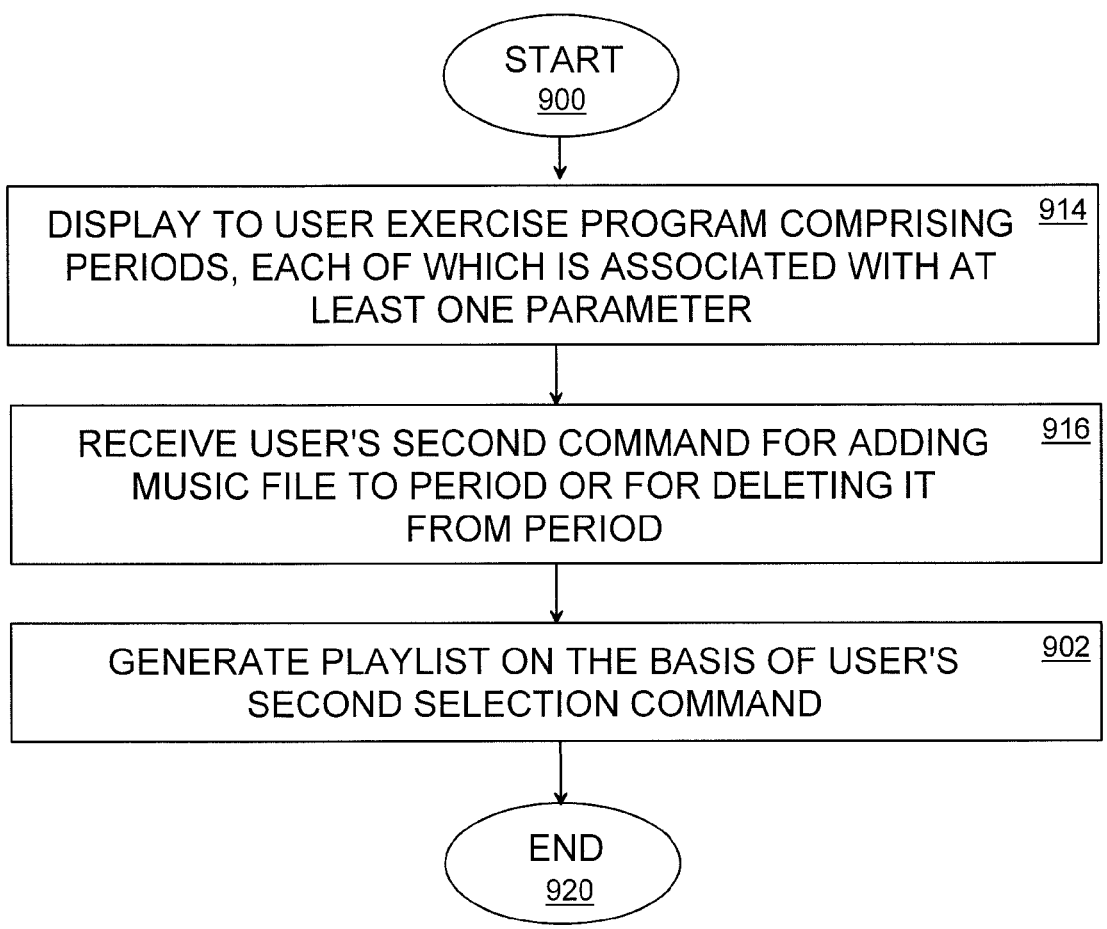
FIG. 13 is a fifth example of an embodiment of the method.

With reference to FIG. 13, in 914 the user is shown a exercise program that comprises several periods 704A to 704C, each of which periods 704A to 704C is associated with at least one parameter 706A to 706C.

In 916 there is received the user's second selection command 724 for adding the music file to the period 704A to 704C or for deleting it from the period 704A to 704C.

In 902 there is generated a performance-controlling playlist 308 on the basis of the user's second selection command 724.

In 920 the method/computer process ends.

Figure 14:
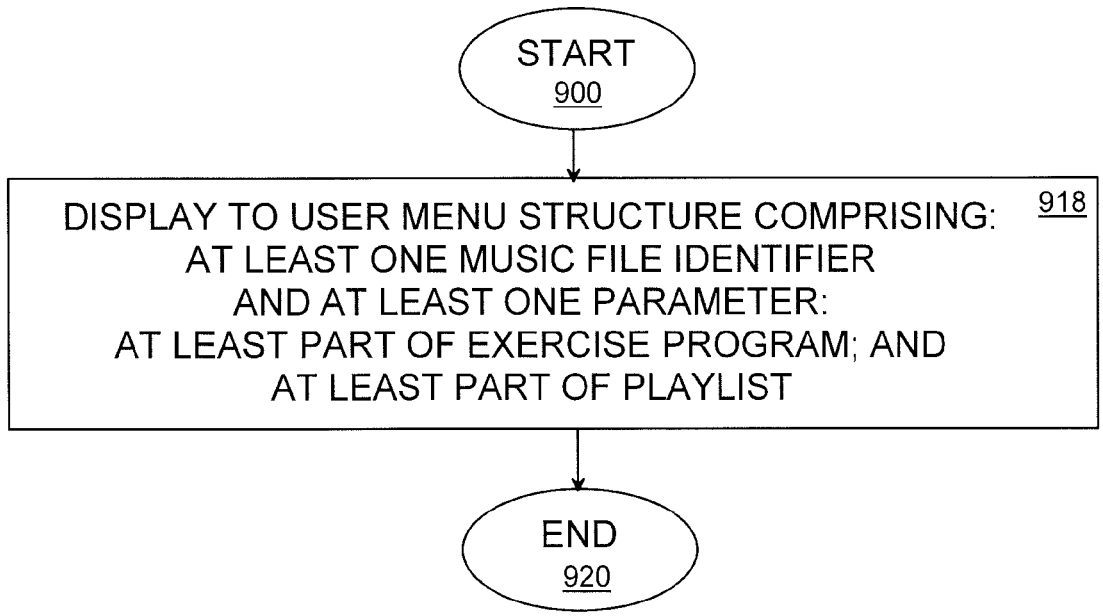
FIG. 14 is a sixth example of an embodiment of the method.

With reference to FIG. 14, in 918 a menu structure is shown to the user comprising:

at least one music file identifier 808A to 808C and at least one parameter 819A to 810C,
at least part of the exercise program and
at least part of the playlist.

In 920 the method/computer process ends.

The computer process of FIGS. 9 to 14 may be encoded into coded instructions that may be included in the computer program. The computer program may be included in a software product. The software may also be included in a readable transfer means of the computer, such as an optical or magnetic transfer means. The transfer means may also be a telecommunication signal.

Even though the invention is described in the above with reference to an example in accordance with the attached drawings, it is apparent that the invention is not restricted thereto but it may be modified in a variety of ways within the scope of the attached claims.

What is claimed is:

1. A method for generating exercise-guiding information that guides performance of an exercise when the information is played by an audio player, the method comprising generating a playlist of music files that guides the performance of the exercise when the playlist is played by the audio player, wherein the playlist includes instructions to play selected music files successively in a desired order, each of the music files being associated with at least one energy parameter by a computing device, wherein the at least one energy parameter is the user's energy consumption during the exercise.

2. The method of claim 1, comprising associating at least one of the music files with at least one parameter by analyzing the content of the at least one music file by the computing device.

3. The method of claim 1, comprising determining by the computing device at least one parameter by means of performance data, the performance data being recorded while at least one of the music files was listened to during the exercise.

4. The method of claim 1, comprising:
    displaying a music file identification information and at least one parameter to the user by a display device;
    receiving a first selection command from the user by the computing device for adding at least one music file to the performance-guiding playlist or for deleting at least one music file from the performance-guiding playlist; and
    generating the performance-guiding playlist on the basis of the first selection command from the user by the computing device.

5. The method of claim 4, comprising displaying to the user a menu structure comprising:
    at least one music file identifier and at least one parameter;
    at least part of an exercise program; and
    at least part of the playlist.

6. The method of claim 1, comprising:
    displaying to the user by a display device an exercise program comprising several periods, each of the periods being associated with at least one parameter;
    receiving a second selection command from the user by the computing device for adding at least one music file to the period or for deleting the at least one music file from the period; and
    generating a playlist by the computing device that guides the performance of the exercise on the basis of the second selection command from the user.

7. The method of claim 6, comprising displaying to the user by a display device a menu structure comprising:
    at least one music file identifier and at least one parameter;
    at least part of the exercise program; and
    at least part of the playlist.

8. The method of claim 1, comprising encoding at least one parameter into the playlist by the computing device.

9. A tangible computer readable carrier comprising instructions thereon configured to cause a computing device to generate a playlist of music files that guides performance of an exercise when the playlist is played, wherein the playlist includes instructions to play selected music files successively in a desired order, each of the music files being associated with at least one energy parameter, wherein the at least one energy parameter is the user's energy consumption during the exercise.

10. A system for generating exercise-guiding that guides performance of an exercise when the information is played, the system comprising a computing device to generate a playlist of music files that guides performance of the exercise when the playlist is played, wherein the playlist includes instructions to play selected music files successively in a desired order, each of the music files being associated by the computing device with at least one energy parameter that is the user's energy consumption during the exercise.

11. The system of claim 10, wherein the computing device associates at least one of the music files with at least one parameter by analyzing the content of the at least one music file.

12. The system of claim 10, wherein the computing device determines at least one parameter on the basis of performance data, the performance data being recorded while at least one of the music files was listened to during the exercise.

13. The system of claim 10, the system further comprising:
    a display device for displaying music file identification information and the energy parameter to the user; and
    a receiving device for receiving a first selection command from the user for adding at least one music file to the playlist that guides the performance of the exercise when played or for deleting the at least one music file from the playlist that guides the performance of the exercise when played, the computing device generating the playlist that guides the performance of the exercise on the basis of the first selection command from the user.

14. The system of claim 13, the system comprising a display device for displaying to the user a menu structure comprising:
    at least one music file identifier and at least one parameter;
    at least part of an exercise program; and
    at least part of the playlist.

15. The system of claim 10, the system further comprising:
    a display device for displaying to the user an exercise program comprising several periods, each of the periods being associated with at least one parameter; and
    a receiving device for receiving a second selection command from the user for adding at least one music file to the period or for deleting the at least one music file from the period, the computing device generating the playlist that guides the performance of the exercise when played on the basis of the second selection command from the user.

16. The system of claim 15, the system comprising a display device for displaying to the user a menu structure comprising:
    at least one music file identifier and at least one parameter;
    at least part of the exercise program; and
    at least part of the playlist.

17. The system of claim 10, the system comprising an encoding device for encoding at least one parameter into the playlist.

* * * * *